Patented July 28, 1925.

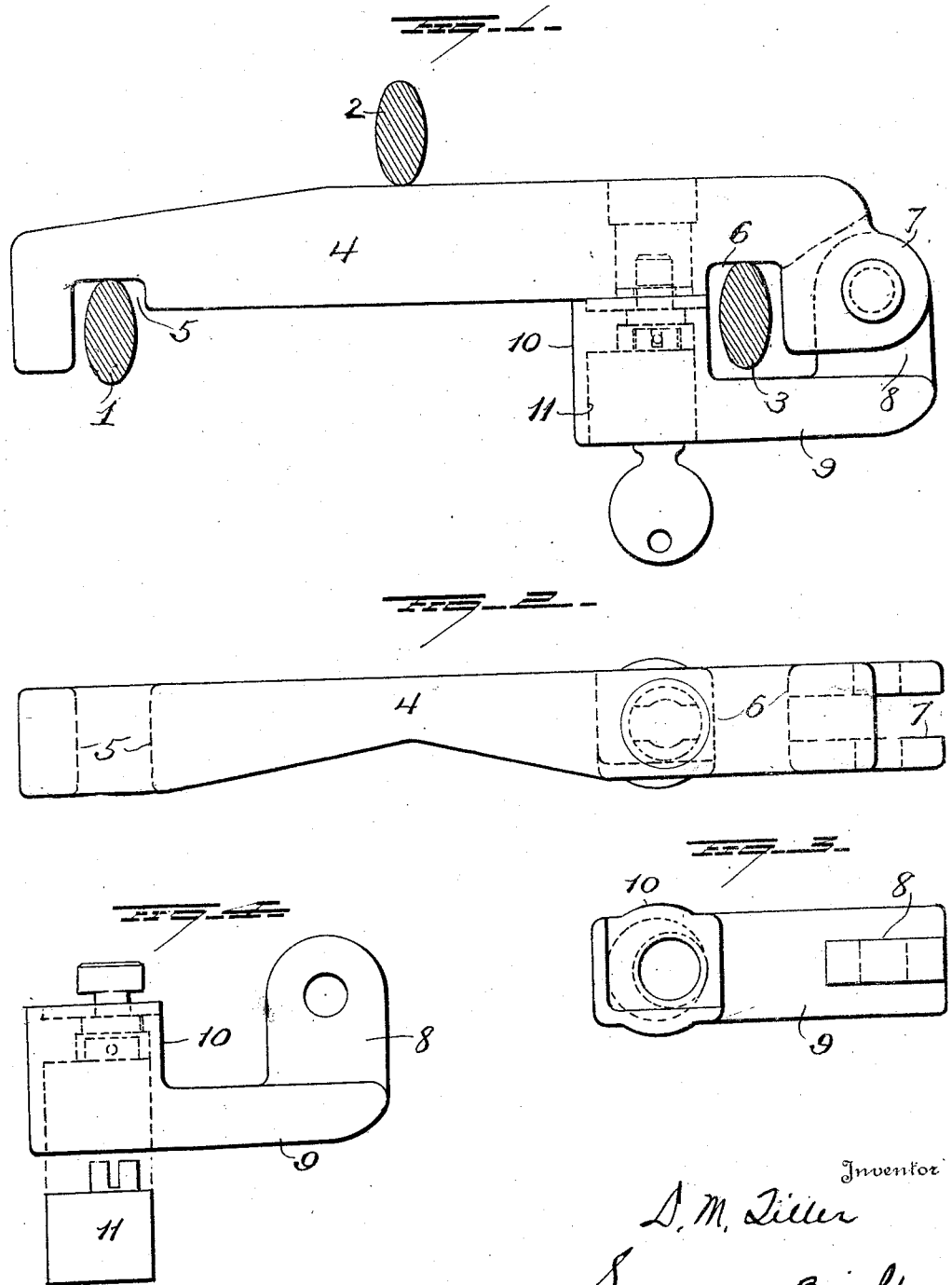

1,547,976

UNITED STATES PATENT OFFICE.

DAVID M. TILLER, OF KANSAS CITY, MISSOURI.

LOCKING DEVICE FOR MOTOR VEHICLES.

Application filed August 2, 1921. Serial No. 489,320.

*To all whom it may concern:*

Be it known that I, DAVID M. TILLER, a citizen of the United States, and a resident of Kansas City, in the county of Jackson and State of Missouri, have invented certain new and useful Improvements in Locking Devices for Motor Vehicles; and I do hereby declare the following to be a full, clear, and exact description of the invention, such as will enable others skilled in the art to which it appertains to make and use the same.

This invention relates to improvements in locking devices for motor vehicles, and more particularly to pedal locking means for a Ford car,—one object of the invention being to provide a simple and efficient device which may be attached and locked to one of the pedals and have a portion which may be disposed between the other two pedals of the control devices and prevent the same from movement.

With this and other objects in view, the invention consists in certain novel features of construction and combinations of parts as hereinafter set forth and pointed out in the claim.

In the accompanying drawings, Figure 1 is a face view showing the application of my improvement, the controlling pedals being shown in section. Figure 2 is a plan view, Figure 3 is an end view of the lock-carrying arm, and Fig. 4 is a side view of the said arm with the lock attached.

In Figure 1 of the drawings I have indicated the relative positions of the control pedals of a Ford car,—the clutch pedal being shown at 1; the reverse pedal at 2 and the brake pedal at 3.

My improved locking device includes in its construction a bar 4 having a notch 5 near one end to receive the clutch pedal 1 and having a notch 6 near its other end to receive the brake pedal 3, the reverse pedal 2 being located (as viewed in Figure 1) over an intermediate portion of said bar when the device is in position to lock the several pedals against movement. The end of the bar 4 nearest the notch portion 6 is provided with ears 7 which receive between them an ear 8 projecting from an arm 9,— a pivot or hinge pin being passed through the ears 7 and 8 to pivotally connect the arm 9 with the bar 4. The arm 9 is provided at its end opposite the ear 8 with a forwardly projecting enlargement 10 to abut the main bar 4, and in which a lock 11 is housed and the bar 4 has housed therein suitable engaging means for the bolt of said lock.

In applying the device the reverse pedal will be moved forwardly and the bar 4 (with the hinged arm 9 unlocked therefrom) will be inserted between the reverse pedal and the clutch and brake pedals so that it will occupy a position with respect to said pedals as shown in Figure 1. The hinged arm 9 will then be swung to position to enclose the brake pedal 3 between it and the bar 4 and will then be locked to the latter, thus preventing any possible movement of any of said pedals.

Having fully described my invention what I claim as new and desire to secure by Letters-Patent, is:

Pedal-locking means for motor vehicles, consisting of a single bar adapted to bear at its front side against an intermediate pedal and provided in its rear side adjacent its ends with recesses to engage side pedals, a short arm pivoted to one end of the bar to extend across the rear side of the adjacent side pedal substantially parallel to the bar and having its free end projected forward to abut the bar immediately adjacent said pedal at the side thereof more remote from the pivot, and a lock housed in said forwardly projecting free end of the arm having its bolt engageable in the bar immediately at the side of the recess in which said pedal is engaged.

In testimony whereof, I have signed this specification in the presence of two subscribing witnesses.

DAVID M. TILLER.

Witnesses:
E. E. HARRINGTON,
D. V. VAN DYKE.